United States Patent
Velummylum et al.

(10) Patent No.: US 8,180,688 B1
(45) Date of Patent: May 15, 2012

(54) COMPUTER-READABLE MEDIUM, SYSTEM, AND METHOD FOR ITEM RECOMMENDATIONS BASED ON MEDIA CONSUMPTION

(75) Inventors: Piragash Velummylum, Seattle, WA (US); John G. Laban, Seattle, WA (US); Ethan Z. Evans, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/893,558

(22) Filed: Sep. 29, 2010

(51) Int. Cl.
*G06Q 30/00* (2012.01)
*G06F 17/30* (2006.01)

(52) U.S. Cl. ............ 705/26.7; 705/26.1; 705/27.1

(58) Field of Classification Search ......... 705/26.1–27.2
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 2007/0156539 A1 * | 7/2007 | Yates | 705/26 |
| 2008/0015950 A1 * | 1/2008 | Al-Azzawe | 705/26 |
| 2008/0243632 A1 * | 10/2008 | Kane et al. | 705/26 |
| 2008/0243637 A1 | 10/2008 | Chan | |
| 2009/0070185 A1 * | 3/2009 | Farrelly | 705/10 |
| 2009/0172021 A1 | 7/2009 | Kane | |
| 2011/0082735 A1 * | 4/2011 | Kannan et al. | 705/14.23 |
| 2011/0276567 A1 * | 11/2011 | Asikainen et al. | 707/728 |

OTHER PUBLICATIONS

"Bringin magic tot-commerce.(Brief Article)(Statistical Data Included)." Broadcasting & Cable. Jul. 24, 2000. vol. 130, No. 31, p. 41 [recovered from Dialog on Dec. 21, 2011].*

* cited by examiner

*Primary Examiner* — Will Allen
*Assistant Examiner* — Kathleen G Palavecino
(74) *Attorney, Agent, or Firm* — Thomas, Kayden, Horstemeyer & Risley, LLP

(57) ABSTRACT

Disclosed are various embodiments for generating item recommendations based on broadcast media consumed by a user on a client device. An item recommendation application receives a quantity of media information associated with the broadcast media being consumed from the client device. The item recommendation application determines a pattern of media consumption behavior for the user based at least in part on an analysis of the user's consumption history. The item recommendation identifies other consumers of broadcast media that exhibit a substantially similar pattern of media consumption behavior. The item recommendation application then gathers items purchased by the other consumers and provides those items as the item recommendations to the requesting process.

23 Claims, 8 Drawing Sheets ated by a plurality of processes that employ, for example, video and audio analysis, a comparison of a items purchased # COMPUTER-READABLE MEDIUM, SYSTEM, AND METHOD FOR ITEM RECOMMENDATIONS BASED ON MEDIA CONSUMPTION

BACKGROUND

Many people consume broadcast media such as television shows and movies for many hours a week. The consumed broadcast media may depict a variety of items during the course of the transmission, such as clothing, books, movies, accessories, electronics, and/or any other type of item.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating item recommendations based on items identified in broadcast media and making the items recommended available for purchase in an electronic commerce system. In the following discussion, a general description of the system and its components is provided, followed by a discussion of the operation of the same.

Figure 1:
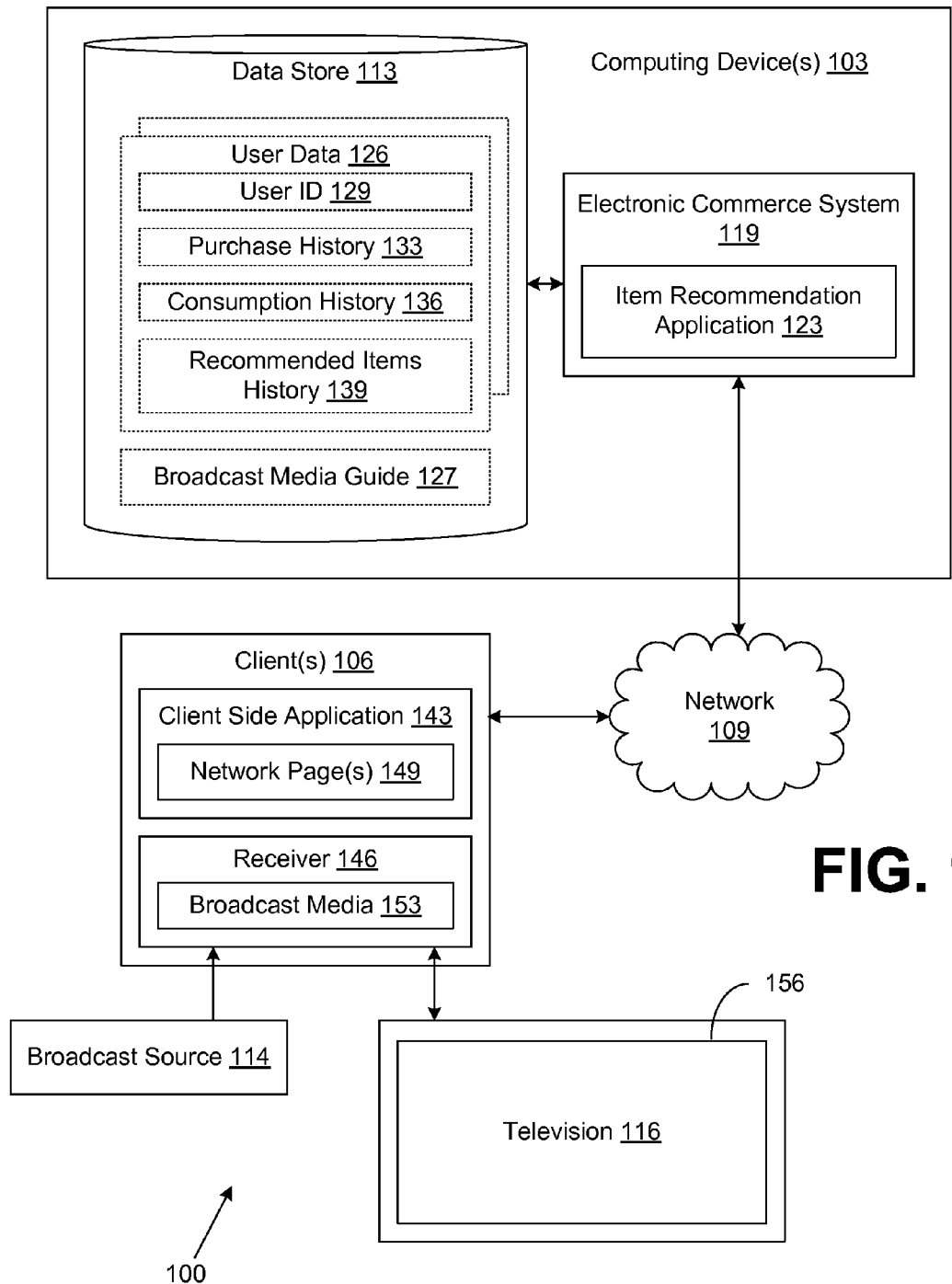
FIG. 1 is a drawing of a networked environment according to various embodiments of the present disclosure.

With reference to FIG. 1, shown is a networked environment 100 according to various embodiments. The networked environment 100 includes a computing device 103, a client 106, a network 109, a broadcast source 114 and a television 116. The broadcast source 114 includes, for example, a satellite, an antenna, and/or a cable network such as, for instance, fiber optics, analog-to-digital conversion, and/or other types of cable networks. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements.

For example, a plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 119 and other applications, services, processes, systems, engines, or functionality not discussed in detail herein. The electronic commerce system 119 includes various components such as an item recommendation application 123 and other applications and/or processes.

The electronic commerce system 119 is executed in order to facilitate the online purchase of items, such as, goods and/or services, over the network 109. The electronic commerce system 119 also performs various back-end functions associated with the online presence of a merchant in order to facilitate the online purchase of items. For example, the electronic commerce system 119 generates network pages 149 such as web pages, content for applications on set top boxes and/or consoles, or other types of network content that are provided to clients 106 for the purposes of selecting items for purchase, rental, download, lease, or other form of consumption as will be described. Additionally, the item recommendation application 123 is configured to generate item recommendations based on broadcast media being received by the client 106. For example, the item recommendations are generated by a plurality of processes that employ, for example, video and audio analysis, a comparison of a items purchased by other viewers of the broadcast media, collaborative approaches, and potentially other processes.

The data stored in the data store 113 includes, for example, user data 126 that is maintained for each one of a plurality of users, a broadcast media guide 127, and potentially other data. The user data 126 for a given user includes a user identifier (ID) 129, a purchase history 133, a consumption history 136, a recommended items history 139, and other data such as name, shipping addresses, billing addresses, payment instrument information, and other information not described herein. In one embodiment the user ID 129 represents a globally unique user ID used by the electronic commerce system 119. The purchase history 133 includes a listing of the past purchases made by a user in the electronic commerce system 119. Further, the purchase history 133 may store media information about a broadcast media 153 associated with the purchase such as, for instance, a name of the broadcast media 153 and other information at the time a user made the purchase. The consumption history 136 includes information associated with the broadcast media 153 consumed and/or or purchased by a user in the electronic commerce system 119, such as, for instance, timing, channels, genre and/or other media identifiers associated with the broadcast media.

The recommended items history 139 includes a listing of past items recommend to a user in the electronic commerce system 119.

Further, the broadcast media guide 127 includes a catalog of media information associated with the broadcast media 153. In one embodiment, the broadcast media guide 127 may be organized based on media information of the broadcast media 153. For example, the media information comprises broadcast names of the broadcast media 153, broadcast times of the broadcast media 153, broadcast channels over which the broadcast media 153 was transmitted, a geographic broadcast area, a synopsis of the subject matter of the broadcast media 153, subject matter of the broadcast media 153, and/or other information associated with the broadcast media 153. The contents of the broadcast media guide 127 may be acquired from a media distribution center, a third party source, and/or any other source. In one embodiment, the contents of the broadcast media guide 127 may be updated on a periodic basis.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 143, a receiver application 146 and/or other applications. The client side application 143 may be executed in a client 106, for example, to access and render network page(s) 149, such as web pages, or other network content served up by the computing device 103 and/or other servers. To this end, the client side application 143 may comprise, for example, a browser application or similar application. The client 106 may be configured to execute applications beyond client side application 143 such as, for example, email applications, instant message applications, and/or other applications.

The receiver application 146 may be configured to process broadcast media 153 received from a broadcaster through a cable system, broadcast source 114, or other media transmission medium that is rendered, for example, on the television 116. For instance, the receiver application 146 may convert the signal received from the broadcast source 114 from an analog signal to a digital signal. Additionally, the receiver application 146 then makes the processed signal available to the television 116 to be rendered on a display screen 156. Additionally, the television 116 also renders network page(s) 149 received by the electronic commerce system 119. For example, the television 116 may render the network page(s) 149 either individually or in combination with the broadcast media 153. In one embodiment, the television 116 may comprise a portion of the client 106 thereby causing the television 116 and the client 106 to function as one unit.

Next, a general description of the operation of the various components of the networked environment 100 is provided. To begin, the broadcast source 114 receives transmitted broadcast media 153 from a broadcast source, such as, for instance, a broadcast center via a plurality of satellites. The transmitted broadcast media 153 is then received by the receiver application 146, processed, and then communicated to the television 116 to be rendered on display screen 156. The broadcast media 153 comprises television shows, commercials, infomercials, movies, documentaries, videos on demand, and/or any other type of broadcast media 153 received by the broadcast source 114.

Having received the broadcast media 153, a user consumes the received broadcast media 153, for example, by way of the television 116. For instance, the user may consume the broadcast media by viewing and/or recording media such as television shows. In one embodiment, the user may be required to supply a user ID 129 before consuming the broadcast media 153. Further, on a first access, a user may be required to register with the electronic commerce system 119 by creating a unique user ID 129 and/or supply other unique identifying information.

Once the user begins consuming the broadcast media 153 on the television 116, the user may wish to purchase and/or obtain purchasing information about an item being depicted in the broadcast media 153. As one example, the user may request to purchase and/or obtain information associated with the purchase of an item being depicted in the broadcast media 153 by activating a button on a remote control device associated with the television 116. The television 116 may communicate this request using a signal to the client side application 143 such as, for instance, an infrared signal or other type of signal. In one embodiment, the client side application 143 begins transmitting a quantity of media information associated with the broadcast media 153 being consumed on the television 116 to the electronic commerce system 119 via the network 109 upon receiving the signal from the television 116.

For instance, the media information may comprise identifiers of the broadcast media 153 such as, for instance, a broadcast name, a broadcast time, a broadcast channel and/or any other identifiers associated with the broadcast media 153. For example, the broadcast name of the broadcast media 153 may be a title and/or episode name of the television show being viewed by the user. Further, the client side application 143 may also transmit a geographic location of the client 106. In another embodiment, the client side application 143 may transmit the subject matter of the broadcast media 153 to the electronic commerce system 119 via the network 109. Additionally, in one embodiment, the client side application 143 may begin transmission of the above-identified data to the electronic commerce system 119 without a user indication. For example, the client side application 143 may begin transmitting the above-identified data to the electronic commerce system 119 as a back-end process when a user begins to watch broadcast media 153 or at some other time.

The electronic commerce system 119 receives the media information and/or the subject matter of the broadcast media 153 from the client side application 143 and makes the item(s) depicted in the broadcast media 153 available for purchase. For instance, if the subject matter of the broadcast media 153 is received, the electronic commerce system 119 may execute a plurality of approaches to determine the item(s) being depicted. In one embodiment, media analysis may be employed for this purpose that comprises a video analysis in which a plurality of frames associated with the broadcast media 153 are processed with image recognition software to recognize the item(s) being depicted in the broadcast media 153. Further, the media analysis may also comprise an audio analysis where the audio associated with the broadcast media 153 is analyzed to identify words such as the names of items or other words mentioned in the broadcast media 153. In another embodiment, the media analysis may comprise analysis of works in a closed-caption if closed-captioning is provided with the broadcast media 153. In this embodiment, the words in the closed-caption may be parsed for key words, as will be discussed. The electronic commerce system 119 may then return a network page 149 that includes the depicted item(s) made available for purchase to the client side application 143.

As another example, if the media information is received, the electronic commerce system 119 may determine the items being displayed and/or depicted in the broadcast media 153 from the media information received from the client side application 143. As previously discussed, the media information may comprise identifiers such as, for instance, the broadcast name, the broadcast time, and the broadcast channel and/or any other identifier of the broadcast media 153. In one embodiment, the electronic commerce system 119 uses the identifiers in the media information to identify the subject matter of the broadcast media 153 being consumed by the user.

For instance, the electronic commerce system 119 obtains the subject matter of the broadcast media 153 previously cataloged and organized in the broadcast media guide 127 according to the identifiers in the media information. As an example, the electronic commerce system 119 may retrieve the subject matter of the broadcast media 153 having a specific broadcast name from the broadcast media guide 127. Upon obtaining the subject matter of the broadcast media 153, the electronic commerce system 119 may employ one or more media analysis approaches to identify the items depicted in the broadcast media 153 and then make the items depicted in the broadcast media 153 available for purchase, as discussed above.

In addition to making the items depicted in the broadcast media 153 available for purchase, the electronic commerce system 119 also recommends other items and makes the item recommendations available for purchase. For instance, the electronic commerce system 119 executes the item recommendation application 123 to generate the item recommendations. The item recommendations may be generated using a number of approaches, as will be discussed. Further, the item recommendations may be included in the same network page 149 as the network page 149 offering for sale the depicted items in the broadcast media 153.

In one embodiment, the item recommendation application 123 generates the item recommendations by correlating the media consumption behavior of a user with the media consumption behavior of other users who have consumed the current broadcast media 153. Items purchased by those other users with similar media consumption behavior are then recommended to a given user. For example, the electronic commerce system 119 stores the media consumption information and behavior of users in their respective consumption histories 136, and the purchasing information of users in their respective purchase histories 133, as discussed above. The item recommendation application 123 identifies other users who have consumed and/or are currently consuming the current broadcast media 153 by extracting information from the consumption history 136 for all users. For example, the item recommendation application 123 compares the media information transmitted by the client side application 143 such as, for instance, the broadcast name, with the information in the consumption history 136 to identify other users who have also consumed broadcast media 153 having the same or similar broadcast name as the current broadcast media 153.

Having identified the other users, the item recommendation application 123 gathers the items accessed by the other users that have also consumed the broadcast media 153 for each identified user. For example, the item recommendation application 123 identifies the items purchased from the respective purchase histories 133. Other types of access to the items include viewing the item, searching for the item, adding the item to cart, and/or other accesses to the item. In one embodiment, each purchase history 133 contains a list of items purchased by a user and media information of the consumed broadcast media 153 associated with that purchase, as described above. The item recommendation application 123 searches the purchase histories 133 of the identified users to gather a list of items purchased that can be considered as being associated with the consumption of the current broadcast media 153.

Further, the item recommendation application 123 generates an aggregate list of items purchased that are associated with the consumption of the broadcast media 153 from all of the identified users and returns the aggregate list to the electronic commerce system 119 as the item recommendations. Additionally, the item recommendation application 123 may include items recommended to the other users identified in addition to the items purchased by the other users that are associated with the consumption of the current broadcast media 153. For example, the items recommended to the other identified users may be gathered from the recommended items history 139.

In another embodiment, the item recommendation application 123 generates item recommendations based on a pattern of media consumption behavior. For example, the item recommendation application 123 identifies a pattern of media consumption behavior for the user consuming broadcast media 153 based at least in part on the consumption history 136 of the user. As previously discussed, the consumption history 136 represents previously consumed broadcast media 153 by the media information associated with the consumed broadcast media 153. The item recommendation application 123 examines the consumption history 136 of the user by analyzing all available identifiers of the media information for all previously consumed media to determine a pattern of media consumption behavior exhibited by the user.

For instance, the item recommendation application 123 compares the timing and other aspects of all the media consumed by the user from the consumption history 136 to determine a pattern of media consumption behavior for the user. The item recommendation application 123 may identify from the consumption history 136 a set of times that a user most frequently consumes media. As an example, the user may consume certain types of media with at least a statistically significant frequency during the hours of 8 PM and 10 PM. The item recommendation application 123 then determines that consuming the respective types of media between the hours of 8 PM and 10 PM is the pattern of media consumption behavior for that user.

Having determined the pattern of media consumption behavior, the item recommendation application 123 searches the consumption history(ies) 136 of all the other users to identify other users having a substantially similar pattern of media consumption behavior. For instance, the item recommendation application 123 searches the times of media consumption in the consumption history(ies) 136 of all the other users and identifies a plurality of users that also consume the respective type of media with a relatively similar frequency during the hours of 8 PM and 10 PM.

Having identified the other users that exhibit a substantially similar pattern of media consumption behavior, the item recommendation application 123 then identifies the items purchased by such users to serve as item recommendations. In one embodiment, the item recommendation application 123 gathers an aggregate list of all items purchased by examining the purchase history(ies) 133 of the identified users having a substantially similar pattern of media consumption behavior. The item recommendation application 123 then returns at least a subset of the items in the aggregate list of items to the electronic commerce system 119 as the item recommendations. In addition to items purchased, the item recommendation application 123 may also identify all of the items accessed by the identified users having a substantially similar pattern of media consumption behavior to serve as the item recommendations, such as, items that were viewed, searched for, added to cart, and/or any other type of access.

In another embodiment, the item recommendation application 123 analyzes the purchase history(ies) 133 of the other users having a similar pattern of media consumption behavior and identifies only those items purchased and/or accessed that are associated with the common pattern of media consumption behavior. For example, the item recommendation application 123 may identify items in the purchase history(ies) 133 of the other users that were purchased while the user was consuming media between the hours of 8 PM and 10 PM. The item recommendation application 123 generates an aggregate list of items purchased and/or accessed by the other users that are associated with the pattern of media consumption behavior and returns at least a subset of the aggregate list to the electronic commerce system 119 as the item recommendations. In one embodiment, the item recommendation application 123 may sort and rank the items before returning the item recommendations to the requesting process. For instance, the item recommendation application 123 may sort and rank the items according to sales figures, customer ratings, and/or other criteria, as will be described.

In another embodiment, the item recommendation application 123 may identify the pattern of media consumption behavior based on the least frequent or most frequent channels the user visits to consume broadcast media 153, the least frequent or most frequent genres of the consumed broadcast media 153, the least frequent or most frequent names of the consumed broadcast media 153, and/or superlatives of other identifiers of the broadcast media 153. Further, the item recommendation application 123 may also identify the pattern of media consumption behavior based on a combination of the identifiers in the media information of the broadcast media 153 discussed above.

Moreover, the item recommendation application 123 may also identify a pattern of media consumption behavior based on the geographic location of the user consuming the broadcast media 153. For example, the item recommendation application 123 may generate item recommendations based on items purchased by other users located within a predefined distance of the geographic location of the current user.

In a further embodiment, the item recommendation application 123 generates item recommendations based at least in part on a synopsis associated with the broadcast media 153. In one embodiment, the synopsis comprises a description of the subject matter of the broadcast media 153. For instance, the synopsis may comprise a summary of a television show, a list of names of the cast members appearing in the television show, a name of an episode of the television show, and/or other descriptive information. Further, the synopsis may be received from the client side application 143, the broadcast center for the broadcast media 153, a third party service provider, and/or any other source.

In one embodiment, the item recommendation application 123 receives the synopsis information of the current broadcast media 153 being consumed from the client side application 143. In another embodiment, the item recommendation application 123 receives the media information associated with the broadcast media 153 from the client side application 143. In this embodiment, the item recommendation application 123 gathers the synopsis associated with the broadcast media 153 from the broadcast media guide 127. For example, the item recommendation application 123 may use the received media information having a broadcast name and broadcast time, and gather the synopsis stored in the broadcast media guide 127.

Having obtained the synopsis information associated with the broadcast media 153 being consumed, the item recommendation application 123 may be configured to extract key words from the content of the synopsis that are associated with an item available for purchase. For instance, the item recommendation application 123 identifies key words such as capitalized words, grammatically emphasized words, words that appear with at least a statistically significant frequency, words identified as being important from a variety of text ranking algorithms, and/or other types of key words. In one embodiment, grammatically emphasized words comprise italicized words, bold-font words, underlined words, and/or other words having other types of grammatical emphasis. Further, capitalized words may comprise a title of the broadcast media 153, names of personalities and cast members appearing in the broadcast media 153, geographic locations that serve as a setting in the broadcast media 153, and/or other types of proper names that appear or are discussed in the broadcast media 153. In another embodiment, a variety of ranking algorithms may be used to identify key words from the synopsis information, such as, term frequency inverse document frequency and/or any other ranking algorithm. For instance, the ranking algorithms may reveal that combinations of key words are more important than individual key words. In this example, the item recommendation application 123 may extract the combinations of key words instead of and/or in addition to the individual key words.

Additionally, the item recommendation application 123 may also store the identified key words and/or combination of key words in the data store 113 as being associated with the respective broadcast media 153 such that the item recommendation application 123 does not repeatedly identify key words in a resource consuming manner. In one embodiment, the key words associated with the synopsis information remain consistent over a period of time and requesting the item recommendation application 123 to identify the key words yields substantially the same result. As such, storing the identified key words from synopsis information associated with the broadcast media 153 may save resources for the item recommendation application 123. However, the relative importance of key words may fluctuate over a period of time such that periodically requesting the item recommendation application 123 to identify key words from the synopsis information may be needed. In another embodiment, the item recommendation application 123 may identify key words from a synopsis associated with a broadcast media 127 periodically and/or contemporaneously.

Upon identifying the key words, the item recommendation application 123 may execute an item search for the identified key words to generate the item recommendations. For example, the item recommendation application 123 may identify "Bali" as a keyword from the synopsis associated with a broadcast media 153 about Bali. In this example, an item search on the "Bali" keyword generates items associated with "Bali" such as a plurality of books on Bali, a plurality of DVDs of documentaries of Bali, a plurality of DVDs of movies that used Bali as a setting, a plurality of vacation packages to Bali, and/or other items associated with Bali.

In another embodiment, the item recommendation application 123 may employ a manual method of generating a plurality of item recommendations from the synopsis, such as Mechanical Turk™, provided by Amazon Technologies, Inc.

(Seattle, Wash.). For instance, the item recommendation application 123 may transmit the synopsis to a service provider that analyzes the content of the synopsis to generate item recommendations. As an example, the service provider may be a person who is capable of reading the synopsis, ascertaining the key words in the synopsis information, identifying items associated with the key words, and returning a list of those items to the item recommendation application 123. In one embodiment, the results from the manual method of generating the item recommendations may be stored such that the method is not repeated in a resource consuming manner.

Further, before surfacing the item search results to the requesting process, the item recommendation application 123 may rank and sort the results of the item search according to available sales data of the respective items in the search results. For instance, the item recommendation application 123 may rank items that have experienced a higher sales velocity ahead of items that have experienced a lower sales velocity. Additionally, the item recommendation application 123 may also rank the items based on gross margin of sales, highest margins, total dollar value, highest rated items, and/or any other criteria for ranking items. The item recommendation application 123 then returns the ranked results of the item search to a requesting process as the item recommendations associated with the broadcast media 153. For example, the item recommendation application 123 returns the ranked results of the item search to the electronic commerce system 119 to be transmitted to the user on the client 106.

Figure 2:
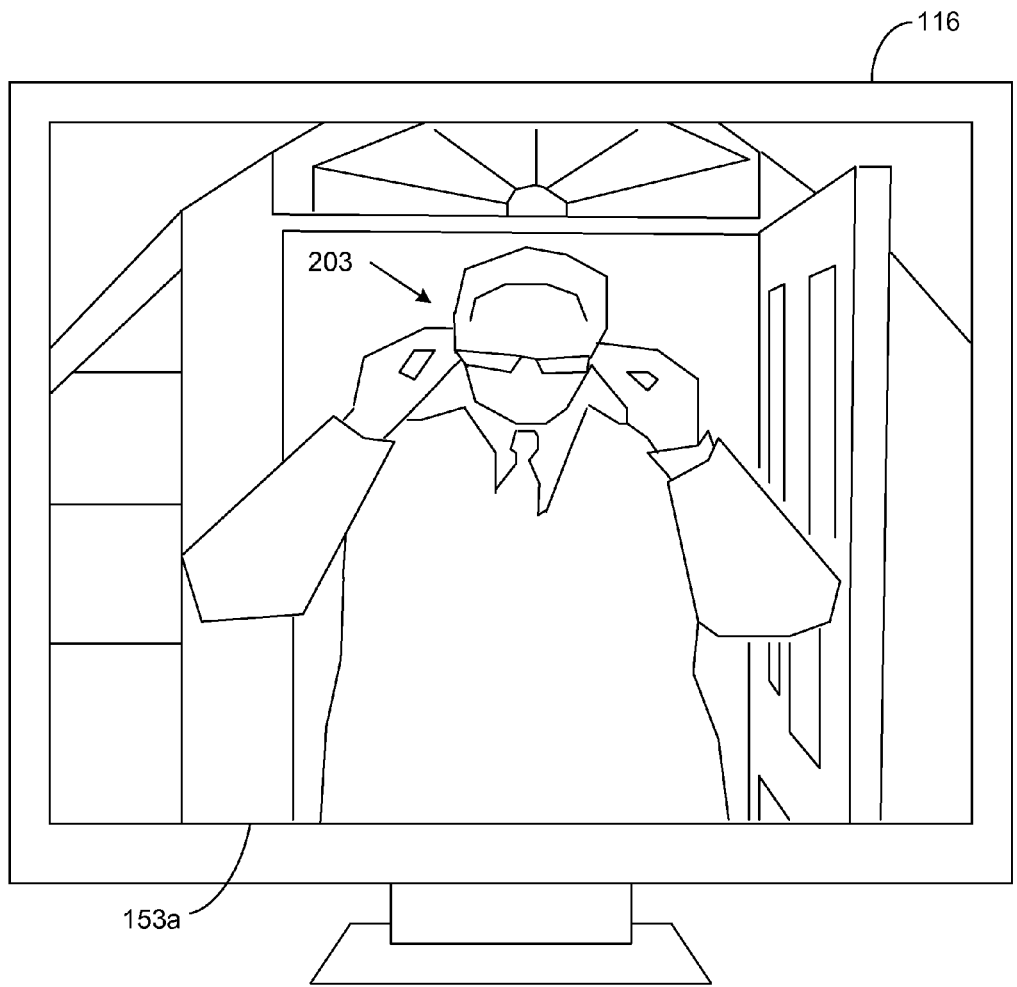
FIGS. 2 and 3 are drawings of an example of a user interface rendered by a client in the networked environment of FIG. 1 according to various embodiments of the present disclosure.

Referring next to FIG. 2, shown is an example of a rendered broadcast media 153 (FIG. 1), denoted herein as broadcast media 153a, that may be viewed on television 116 according to various embodiments. In one embodiment, the broadcast media 153a rendered on television 116 may depict television shows, television commercials, television infomercials, movies, videos on demand, and/or other types of broadcast media, as discussed above. In this example, the broadcast media 153a being rendered on television 116 includes a plurality of broadcast items 203 such as, for instance, a tie, suit coat, a pair of sun glasses, and other items.

Figure 3:
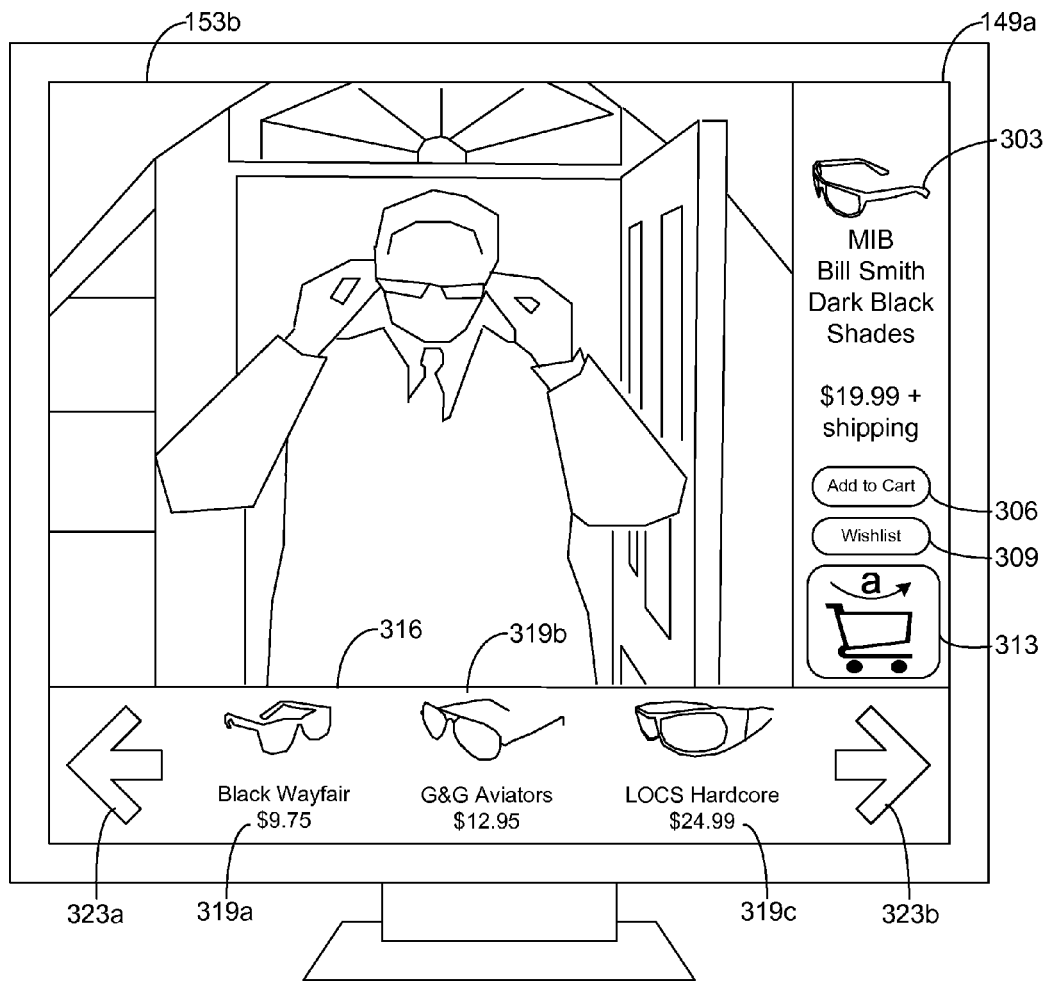

Referring next to FIG. 3, shown is an example of a rendered broadcast media 153 (FIG. 1) combined with an example of a rendered network page 149 (FIG. 1), denoted herein as broadcast media 153b and network page 149a, respectively, that may be viewed on television 116 according to various embodiments. In this example, the broadcast media 153b may comprise a portion of the display screen 156 (FIG. 1), and the network page 149a may comprise another portion of the display screen 156. In one embodiment, the network page 149a includes a broadcast item display area 303, a cart button 306, a wish list button 309, a checkout button 313, an item recommendation display area 316, a plurality of item recommendations 319a, 319b, and 319c, and a plurality of scroll buttons 323a and 323b.

The broadcast item display area 303 displays a broadcast item 203 (FIG. 2) depicted in the broadcast media 153b. For example, the broadcast item 203 displayed in FIG. 3 is a pair of sunglasses. Further, the broadcast item display area 303 contains a price for purchasing the broadcast item 203. The cart button 306 allows the client side application 143 (FIG. 1) to add the broadcast item 203 to a virtual shopping cart of the user where the broadcast item 203 may be purchased at a later time. For instance, the user may be able to continue shopping for other broadcast items on the electronic commerce system 119 (FIG. 1) and visit the shopping cart at a later to time to purchase all of the items at once.

The wish list button 309 allows the client side application 143 to add the broadcast item 203 to the wish list of the user where the user may monitor the broadcast item 203 to purchase at a desirable time. For instance, the price for the broadcast item 203 may be too high for the user to purchase immediately. Adding the broadcast item 203 to the wish list may allow the user to monitor the price of the broadcast item 203 to purchase at a later time. The checkout button 313 allows the client side application 143 to submit a request to the electronic commerce system 119 to purchase the broadcast item 203 depicted in the broadcast item display area 303.

In addition, the network page 149a also includes an item recommendation display area 316. The client side application 143 renders the item recommendations 319 and other purchase related information received by the electronic commerce system 119 in the item recommendation display area 316. For instance, the client side application 143 displays item recommendations 319a, 319b, and 319c and the respective purchase prices in the item recommendation display area 316. Further, the item recommendation display area 316 may also include scroll buttons 323a and 323b to scroll through all the recommended items 319 received by the electronic commerce system 119.

Figure 4:
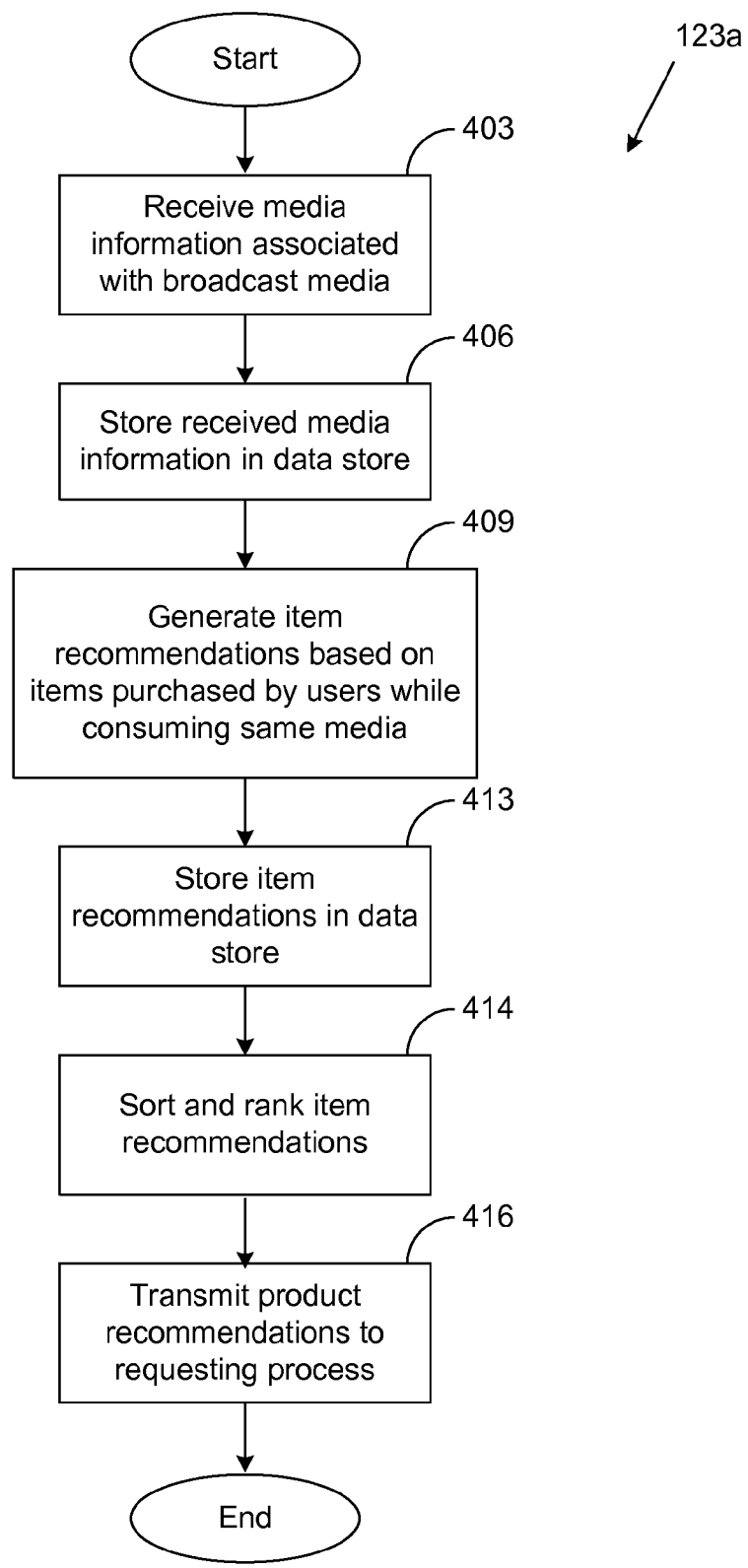
FIGS. 4-6 are flowcharts illustrating examples of functionality implemented as portions of an item recommendation application executed in a computing device in the networked environment of FIG. 1 according to various embodiments of the present disclosure.

Referring next to FIG. 4, shown is a flowchart that provides one example of the operation of a portion of the item recommendation application 123 (FIG. 1), denoted herein as item recommendation application 123a, according to various embodiments. It is understood that the flowchart of FIG. 4 provides merely an example of the many different types of functional arrangements that may be employed to implement the operation of the portion of the item recommendation application 123 as described herein. As an alternative, the flowchart of FIG. 4 may be viewed as depicting an example of steps of a method implemented in the computing device 103 (FIG. 1) according to one or more embodiments.

According to one embodiment, the item recommendation application 123a is a process that generates a plurality of item recommendations based on the broadcast media 153 (FIG. 1) received by the client side application 143 (FIG. 1). For instance, the item recommendation application 123a may generate the item recommendations based on items purchased by all users while consuming the broadcast media 153 (FIG. 1). Further, the item recommendation application 123a is configured to respond to a request for item recommendations from a requesting process. For example, a requesting process may be a process that is generating a network page to present items to a user for possible purchase and/or a process that is presenting a network page to a user to select payment options associated with a purchase, etc.

Beginning with box 403, the item recommendation application 123a receives transmitted media information from the electronic commerce system 119 (FIG. 1). For instance, the electronic commerce system 119 may receive media information associated with the broadcast media 153 from the client side application 143 (FIG. 1) that is then communicated to the item recommendation application 123a to generate item recommendations, as discussed above. In one embodiment, media information comprises the broadcast name of the broadcast media 153, the broadcast time of the broadcast media 153, the broadcast channel of the broadcast media 153, and/or other identifiers of the broadcast media 153. Next, in box 406, the item recommendation application 123a stores the received media information in the data store 113 (FIG. 1). For instance, the item recommendation application 123a stores the broadcast name, the broadcast time, the broadcast channel and/or any other identifiers of the broadcast media 153 in the consumption history 136 (FIG. 1).

In box 409, the item recommendation application 123a generates item recommendations based on items purchased by other users consuming the same broadcast media 153. In one embodiment, the item recommendation application 123a identifies all users who have consumed and/or are consuming the current broadcast media 153 by examining the consumption history(ies) 136 of all the users. For instance, the item recommendation application 123a compares the broadcast name provided in the received media information with a broadcast name contained in the consumption history 136 of all the users to identify other users who have also consumed the broadcast media 153.

Having identified other users that have consumed and/or are consuming the broadcast media 153, the item recommendation application 123a then determines the items those users purchased while consuming the broadcast media 153. For instance, the item recommendation application 123a examines the purchase history(ies) 133 of the identified users to gather a list of purchased items associated with the consumption of the current broadcast media 153. As previously discussed, the purchase history 133 includes a list of all items purchased and the corresponding media information of the consumed broadcast media 153 associated with that purchase. The item recommendation application 123a generates an aggregate list of all the items purchased as the item recommendations to provide for the electronic commerce system 119 and/or another requesting process.

Next, in box 413, the item recommendation application 123a stores the items recommendations from box 409 in the data store. For example, the item recommendation application 123a may store the items recommendations in the recommended items history 139 (FIG. 1). As shown in box 414, the item recommendation application 123a then sorts and ranks the item recommendations according to sales velocity, popularity of the items, profit margins, and/or other criteria, as described above. In particular, the item recommendation application 123 ranks the items with a higher likelihood of being purchased above the other items. Finally, in box 416, the item recommendation application transmits the ranked item recommendations to a requesting process, such as, for instance, another portion of the electronic commerce system 119.

Figure 5:
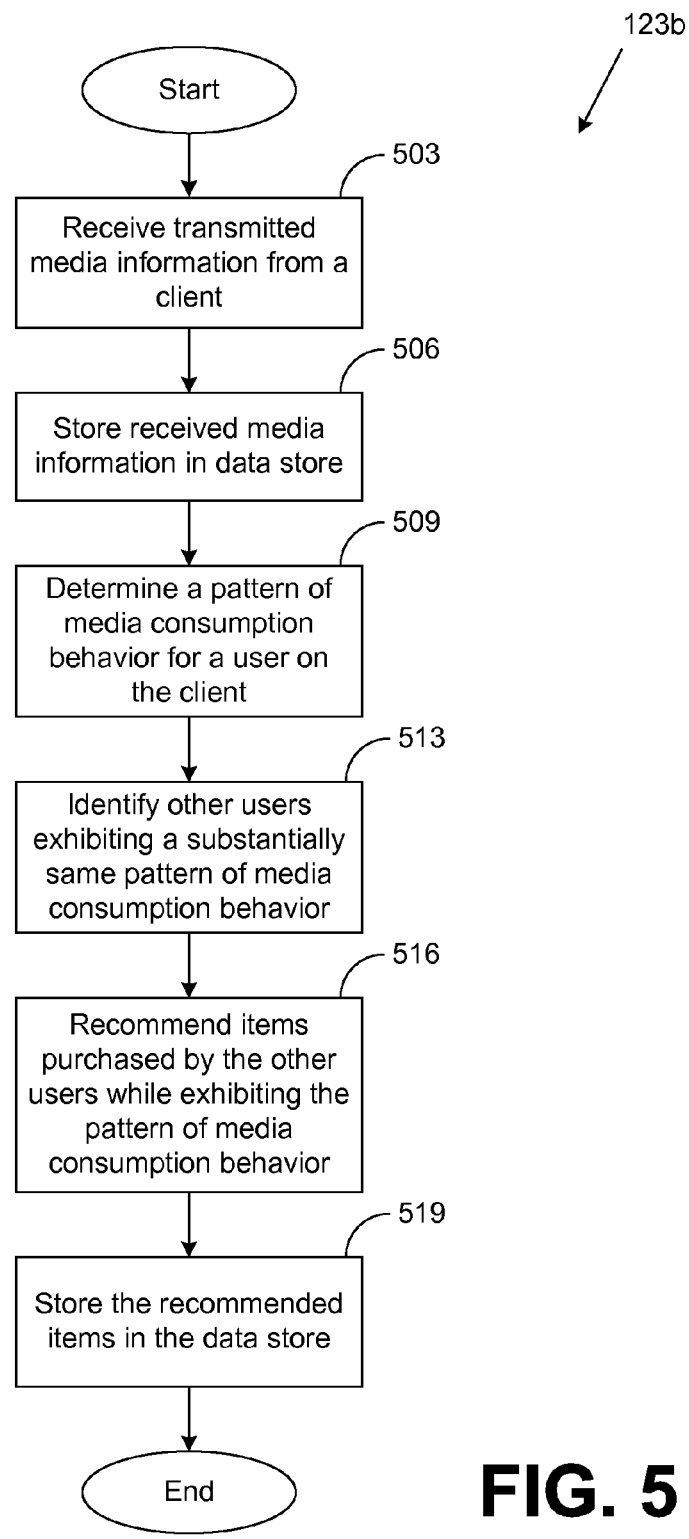

Referring next to FIG. 5, shown is a flowchart that provides one example of the operation of a portion of the item recommendation application 123 (FIG. 1), denoted herein as item recommendation application 123b, according to various embodiments. It is understood that the flowchart of FIG. 5 provides merely an example of the many different types of functional arrangements that may be employed to implement the operation of the portion of the item recommendation application 123 as described herein. As an alternative, the flowchart of FIG. 5 may be viewed as depicting an example of steps of a method implemented in the computing device 103 (FIG. 1) according to one or more embodiments.

According to one embodiment, the item recommendation application 123b is a process that generates a plurality of item recommendations based on the broadcast media 153 (FIG. 1) received by the client side application 143 (FIG. 1). For instance, the item recommendation application 123b may generate the item recommendations based on a pattern of media consumption behavior exhibited while consuming the broadcast media 153 (FIG. 1). Further, the item recommendation application 123b is configured to respond to a request for item recommendations from a requesting process. For example, a requesting process may be a process that is generating a network page to present items to a user for possible purchase and/or a process that is presenting a network page to a user to select payment options associated with a purchase, etc.

Beginning with box 503, the item recommendation application 123b receives transmitted media information from the electronic commerce system 119 (FIG. 1). For instance, the electronic commerce system 119 may receive media information associated with the broadcast media 153 from the client side application 143 (FIG. 1) that is then communicated to the item recommendation application 123b to generate item recommendations, as discussed above. In one embodiment, media information comprises the broadcast name of the broadcast media 153, the broadcast time of the broadcast media 153, the broadcast channel of the broadcast media 153, and/or other identifiers of the broadcast media 153. Next, in box 506, the item recommendation application 123b stores the received media information in the data store 113 (FIG. 1). For instance, the item recommendation application 123b stores the broadcast name, the broadcast time, the broadcast channel and/or any other identifiers of the broadcast media 153 in the consumption history 136 (FIG. 1).

In box 509, the item recommendation application 123b determines a pattern of media consumption behavior for a user on the client 106 (FIG. 1). For example, the item recommendation application 123b may examine the consumption history 136 (FIG. 1) of the user to determine the pattern of media consumption behavior. As previously discussed, the consumption history 136 includes a record of the past broadcast media 153 consumed by the user and/or broadcast media 153 currently being consumed by the user. In one embodiment, the item recommendation application 123b identifies a plurality of channels that a user most frequently visits to consume broadcast media 153. As an example, the user may visit channels 4, 8, and 12 with at least a statistically significant frequency to consume broadcast media 153. The item recommendation application 123b then determines that the visiting channels 4, 8, and 12 to consume broadcast media 153 is the pattern of media consumption behavior for the user.

In one embodiment, the item recommendation application 123b may identify the times that the user consumes broadcast media 153, the names of the consumed broadcast media 153, the genre of the consumed broadcast media 153, and/or any other identifiers of the broadcast media 153 to determine a pattern of media consumption behavior for the user. Further, the item recommendation application 123b may also use the geographic location of the user to determine the pattern of media consumption behavior for the user.

Next, in box 513, the item recommendation application 123b identifies other users in the electronic commerce system 119 that exhibit substantially the same pattern of media consumption behavior. For example, the item recommendation application 123b examines the consumption history(ies) 136 of all the users to identify other users that visit channels 4, 8, and 12 with at least the statistically significant frequency to consume broadcast media 153. In one embodiment, the item recommendation application 123b may then determine that identified users exhibit substantially the same pattern of media consumption behavior.

Having identified other users that exhibit substantially the same pattern of media consumption behavior, the item recommendation application 123b then recommends the items purchased by those users while exhibiting the pattern of media consumption behavior, as shown in box 516. For instance, the item recommendation application 123b gathers an aggregate list of all the items purchased by the identified other users from the purchase history(ies) 133 of the users. In one embodiment, the item recommendation application 123b then narrows the list of purchased items to only those items purchased while the users exhibited the pattern of media consumption behavior. For instance, the item recommendation application 123b uses the media information associated with each item purchased to determine if the item purchased is associated with the pattern of media consumption behavior. In one embodiment, the item recommendation application 123b may also rank and sort the narrowed list of item recommendations according to sales velocity, profit margins, consumer ratings, and/or other criteria, as discussed above. The item recommendation application 123b then transmits the ranked list of item recommendations to the requesting process, such as the electronic commerce system 119. Finally, in box 519, the item recommendation application 123b stores the item recommendations in the data store. For example, the item recommendation application 123b stores the item recommendations in the recommended items history 139.

Figure 6:
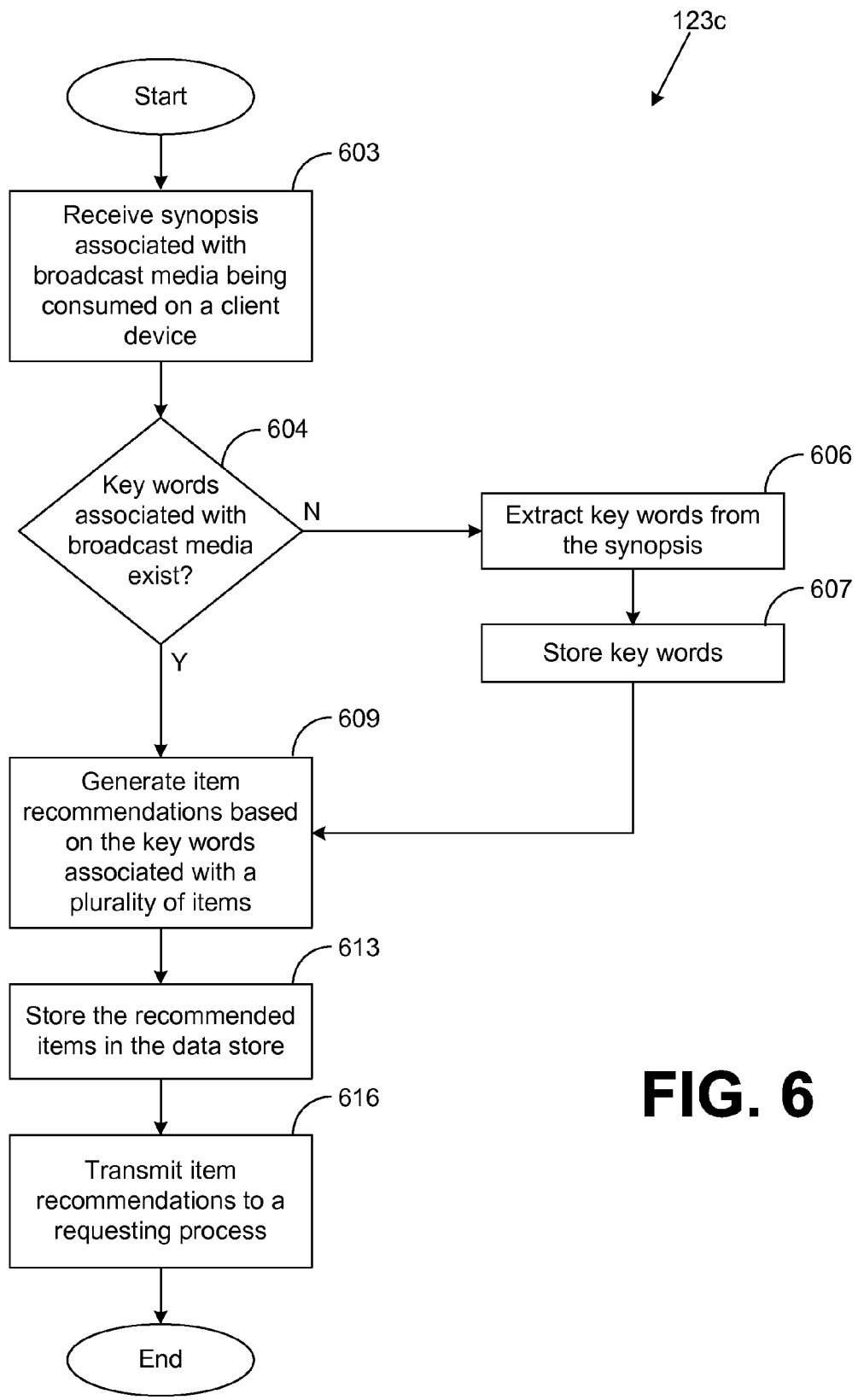

Referring next to FIG. 6, shown is a flowchart that provides one example of the operation of a portion of the item recommendation application 123 (FIG. 1), denoted herein as item recommendation application 123c, according to various embodiments. It is understood that the flowchart of FIG. 6 provides merely an example of the many different types of functional arrangements that may be employed to implement the operation of the portion of the item recommendation application 123 as described herein. As an alternative, the flowchart of FIG. 6 may be viewed as depicting an example of steps of a method implemented in the computing device 103 (FIG. 1) according to one or more embodiments.

According to one embodiment, the item recommendation application 123c is a process that generates a plurality of item recommendations based on the broadcast media 153 (FIG. 1) received by the client side application 143 (FIG. 1). For instance, the item recommendation application 123c may generate the item recommendations based on a pattern of media consumption behavior exhibited while consuming the broadcast media 153 (FIG. 1). Further, the item recommendation application 123c is configured to respond to a request for item recommendations from a requesting process. For example, a requesting process may be a process that is generating a network page to present items to a user for possible purchase and/or a process that is presenting a network page to a user to select payment options associated with a purchase, etc.

Beginning with box 603, the item recommendation application 123c receives synopsis information from the electronic commerce system 119 (FIG. 1). For instance, the electronic commerce system 119 may obtain a synopsis associated with the broadcast media 153 from the client side application 143 (FIG. 1) that is then communicated to the item recommendation application 123c to generate item recommendations, as discussed above. In one embodiment, the synopsis comprises a description of the subject matter of the broadcast media 153. For instance, the synopsis may comprise a summary of the subject matter of the broadcast media 153, names of cast members appearing in the broadcast media 153, and/or other information, as discussed above.

Next, in box 604, the item recommendation application 123c determines if there are any existing key words associated with the broadcast media 153 in the data store. For instance, key words associated with the broadcast media 153 may be available if the item recommendation application 123c already analyzed synopsis information related to the broadcast media 153. If the item recommendation application 123c determines that no key words are associated with the broadcast media 153, then the item recommendation application 123c proceeds to box 606. However, if the item recommendation application 123c determines there are already existing key words associated with the broadcast media 153, then the item recommendation application 123c proceeds to box 609. In another embodiment, the item recommendation application 123c may proceed to box 606 even if key words associated with the broadcast media 153 already exist. In this example, the item recommendation application 123c may be configured to extract key words from the synopsis with a predetermined frequency to ensure that the most relevant key words are extracted.

In box 606, item recommendation application 123c extracts key words from the synopsis. For instance, key words in the synopsis comprise capitalized words, grammatically emphasized words, words that appear with at least a statistically significant frequency, and/or other types of key words, as described above. Further, the item recommendation application 123c may also extract key words based on a variety of text ranking algorithms, such as, for instance the term frequency-inverse document frequency analysis. Upon extracting the key words, the item recommendation application 123c, in box 607, may then store the extracted key words for use on future instances. In box 609, the item recommendation application 123c generates item recommendations based on the identified key words. In one embodiment, the item recommendation application 123c executes an item search on the identified key words to generate the item recommendations.

For example, the item recommendation application 123c may identify "Clint Eastwood" as a key word in the synopsis associated with the broadcast media 153. In this example, an item search on "Clint Eastwood" would reveal a plurality of DVDs of movies starring Clint Eastwood, a plurality of books about Clint Eastwood, and/or other items associated with Clint Eastwood. In one embodiment, the item recommendation application 123c may further rank the results of the item search according to sales velocity associated with the item. For instance, the item recommendation application 123 may rank an item having a higher sales velocity ahead an item having a lower sales velocity.

In box 613, the item recommendation application 123c stores the item recommendations from box 609 in the data store. For example, the item recommendation application 123c may store the item recommendations in the recommended items history 139 (FIG. 1). Finally, in box 616, the item recommendation application 123c transmits the generated item recommendations to a requesting process, such as, for instance, the electronic commerce system 119.

Figure 7:
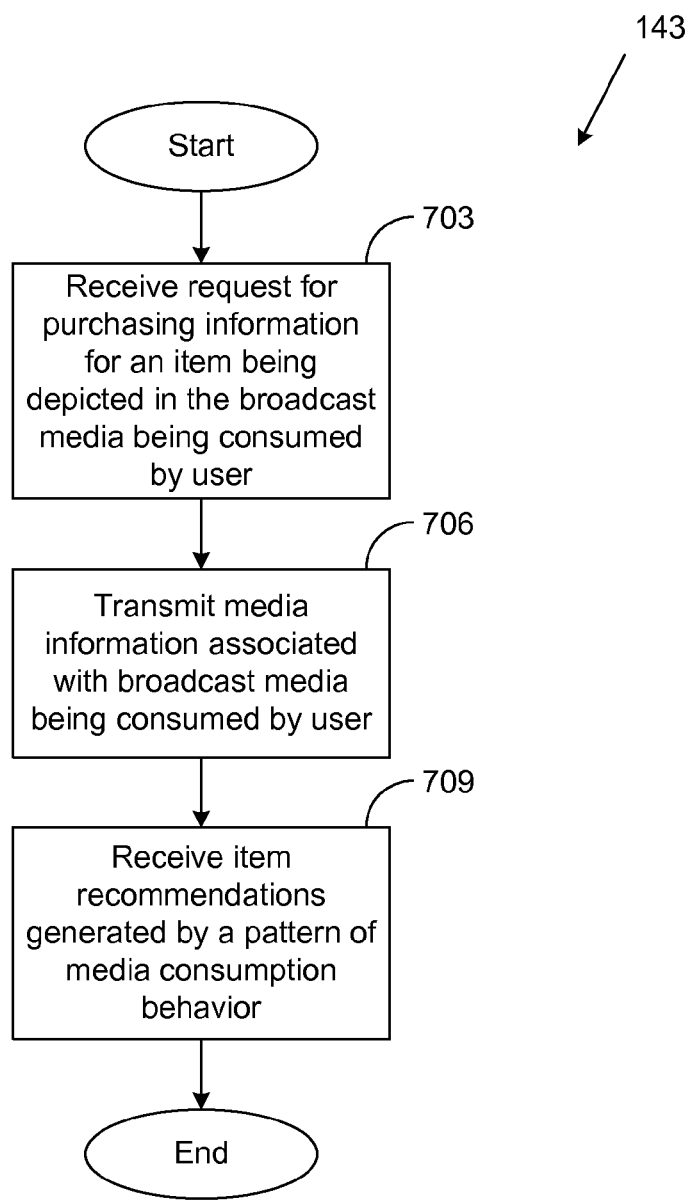
FIG. 7 is a flowchart illustrating one example of functionality implemented as portions of a client side application in a client device in the networked environment of FIG. 1 according to various embodiments of the present disclosure.

Referring next to FIG. 7, shown is a flowchart that provides one example of the operation of a portion of the client side application 143 (FIG. 1) according to various embodiments. It is understood that the flowchart of FIG. 7 provides merely an example of the many different types of functional arrangements that may be employed to implement the operation of the portion of the client side application 143 as described herein. As an alternative, the flowchart of FIG. 7 may be viewed as depicting an example of steps of a method implemented in the computing device 103 (FIG. 1) according to one or more embodiments.

According to one embodiment, the client side application 143 is a process that transmits a quantity of media information associated with the broadcast media 153 (FIG. 1), the subject matter of the broadcast media 153, and/or a synopsis associated with the broadcast media 153 to the computing device 103. Further, the client side application 143 is configured to respond to a request for purchasing and/or information associated with purchasing an item depicted in the broadcast media 153 currently being consumed. For example, as shown in box 703, a user may request purchasing information for an item depicted in the broadcast media 153 by pressing a button on a remote control device associated with the television 116 (FIG. 1).

Next, in box 706, the client side application 143 transmits a quantity of media information associated with the broadcast media 153 being consumed by the user to the electronic commerce system 119. In another embodiment, the client side application 143 transmits the subject matter of the broadcast media 153 and/or the synopsis associated with the broadcast media 153 to the electronic commerce system 119. Finally, in box 709, the client side application 143 receives item recommendations based on a pattern of media consumption behavior of the user consuming the broadcast media 153, as discussed above. For example, the pattern of media consumption behavior may be based, at least in part, on the times the user consumes the broadcast media 153, the channels the user visits to consume the broadcast media 153, the genre of the broadcast media 153 consumed by the user, the geographic location of the user while consuming broadcast media 153, and/or any other identifier of the broadcast media 153. Further, the pattern of media consumption behavior may also be based on a combination of the above-mentioned identifiers of the broadcast media 153.

In another embodiment, the received item recommendations may also be generated based on items purchased by other users while consuming the same broadcast media 153 as the current user. As previously discussed, the client side application 143 may receive item recommendations based on a correlation between other users who are currently consuming the same broadcast media 153 as the current user and/or who have consumed the same broadcast media 153 in the past. In yet another embodiment, the received item recommendations may also be generated from the synopsis associated with the broadcast media 153. As previously discussed, the synopsis comprises a description of the subject matter of the broadcast media 153. The item recommendations may be generated from an item search of key words that comprise the synopsis, as discussed above.

Figure 8:
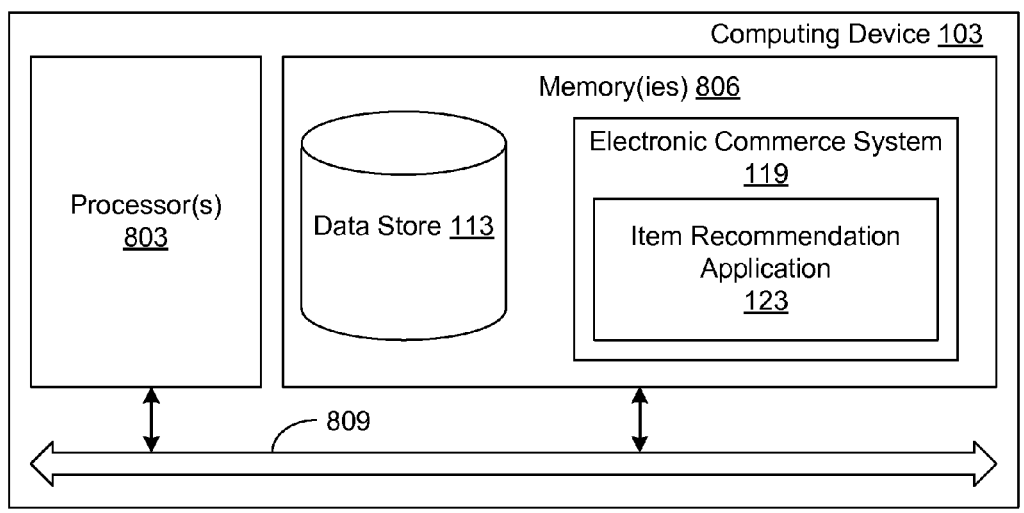
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce system 119, the item recommendation application 123, and potentially other applications. Also stored in the memory 806 may be a data store 113 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce system 119, the item recommendation application 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-7 show the functionality and operation of an implementation of examples of the item recommendation application 123 and the client side application 143 in the networked environment 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 119 and the item recommendation application 123, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains a media consumption indication from a client device configured to access an electronic commerce system, the media consumption indication identifying a media program being viewed by way of the client device, the media program comprising at least one of a plurality of television shows, a plurality of television commercials, a plurality of television infomercials, a plurality of movies, and a plurality of videos on demand;
    code that stores the media consumption indication in a data store accessible to the computing device;
    code that generates a plurality of item recommendations based on a correlation between a plurality of users who viewed the media program and a plurality of items purchased by the users while the users viewed the media program, the item recommendations being based further on data indicating that the items appear in the media program;
    code that stores the item recommendations in the data store; and
    code that communicates the item recommendations to the client device.

2. The non-transitory computer-readable medium of claim 1, further comprising code that generates additional item recommendations based on items related to the items purchased by the users.

3. The non-transitory computer-readable medium of claim 1, wherein the media consumption indication comprises a broadcast name of the media program, a broadcast time of the media program, and a broadcast channel of the media program.

4. A system, comprising:
    at least one computing device;
    a memory accessible to the at least one computing device; and
    an item recommendation application executable in the at least one computing device, the item recommendation application comprising:
    logic that obtains a media consumption indication from a client device, the media consumption indication identifying a media program being consumed by a first user; and logic that generates at least one item recommendation by:
        determining a plurality of second users who have consumed the media program;
        identifying at least one item based at least in part on a plurality of purchases of the at least one item by the second users while the second users are consuming the media program, wherein the at least one item appears in the media program, and
        recommending the at least one item purchased by the second users to the first users in association with the consumption of the media program by the first user.

5. The system of claim 4, further comprising logic that stores the media consumption indication in a data store accessible to the computing device.

6. The system of claim 4, further comprising logic that stores the item recommendations in a data store accessible to the computing device.

7. The system of claim 4, wherein the media consumption indication indicates at least one of viewing the media program, recording the media program, purchasing the media program, and renting the media program.

8. The system of claim 4, wherein the media consumption indication comprises at least one of a broadcast name of the media program, a broadcast time of the media program, and a broadcast channel of the media program.

9. The system of claim 4, further comprising logic that receives a geographic location associated with the client device and logic that generates additional item recommendations based on the geographic location.

10. The system of claim 4, wherein the media program comprises at least one of a television show, a television commercial, a movie, and a video on demand.

11. The system of claim 4, wherein the client device is selected from a group consisting of: a television, a set top box, and a mobile device.

12. The system of claim 4, wherein the client device is configured to access an electronic commerce system.

13. The system of 4, further comprising logic that receives the subject matter of the media program.

14. The system of claim 4, further comprising logic that ranks the recommended items according to at least one of a sales velocity, a customer rating, a profit margin, and a gross sales figure.

15. The system of claim 4, wherein the at least one item is identified based at least in part on data indicating that the at least one item appears in the media program.

16. The system of claim 4, wherein the at least one item is identified based at least in part on data that describes the media program.

17. The system of claim 4, wherein the second users are also determined based at least in part on the second users substantially exhibiting a same pattern of media consumption behavior as the first user.

18. A method, comprising the steps of:
transmitting, from a client device, a media consumption indication that identifies a media program that is being consumed by a user to a computing device; and
obtaining, in the client device, a plurality of item recommendations generated by:
determining a plurality of second users who have consumed the media program;
identifying a plurality of items based at least in part on a plurality of purchases of the items by a plurality of second users while the second users are consuming the media program, wherein the at least one item appears in the media program, and
recommending the items purchased by the second users to the first user in association with the consumption of the media program by the first user.

19. The method of claim 18, further comprising the step of transmitting the subject matter of the media program to the computing device.

20. The method of claim 18, wherein the media information comprises at least one of a broadcast name of the media program, a broadcast time of the media program, and a broadcast channel of the media program.

21. The method of claim 18, wherein the media program comprises one of a television show, a television commercial, a movie, and a video on demand.

22. The method of claim 18, wherein the client device is configured to access an electronic commerce system.

23. The method of claim 18, further comprising the step of transmitting a geographic location of the receiver to the computing device and receiving additional item recommendations based on the geographic location from the computing device.

* * * * *